United States Patent
Tsuchiya et al.

(10) Patent No.: US 10,403,871 B2
(45) Date of Patent: Sep. 3, 2019

(54) ELECTRIC STORAGE CELL, COVERING FILM AND ELECTRIC STORAGE MODULE

(71) Applicant: TAIYO YUDEN CO., LTD., Taito-ku, Tokyo (JP)

(72) Inventors: Takayuki Tsuchiya, Takasaki (JP); Hiromi Sato, Takasaki (JP); Shinji Ishii, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 15 days.

(21) Appl. No.: 15/475,067

(22) Filed: Mar. 30, 2017

(65) Prior Publication Data
US 2018/0006284 A1   Jan. 4, 2018

(30) Foreign Application Priority Data
Jun. 29, 2016  (JP) .................................. 2016-129038

(51) Int. Cl.
| | |
|---|---|
| *H01M 2/12* | (2006.01) |
| *H01G 11/14* | (2013.01) |
| *H01G 11/58* | (2013.01) |
| *H01M 2/10* | (2006.01) |
| *H01M 10/0566* | (2010.01) |

(Continued)

(52) U.S. Cl.
CPC .......... *H01M 2/1241* (2013.01); *H01G 11/14* (2013.01); *H01G 11/58* (2013.01); *H01G 11/78* (2013.01); *H01M 2/0287* (2013.01); *H01M 2/1094* (2013.01); *H01M 10/0566* (2013.01); *H01G 11/06* (2013.01);

(Continued)

(58) Field of Classification Search
CPC .. H01M 2/0287; H01M 2/0267; H01M 2/021; H01M 2/0212; H01M 2/0285; H01M 2/1061; H01M 2/12; H01G 11/78; H01G 11/80
See application file for complete search history.

(56) References Cited

U.S. PATENT DOCUMENTS

| | | | | |
|---|---|---|---|---|
| 2005/0158622 A1* | 7/2005 | Mizuta | ...................... | H01G 9/08 |
| | | | | 429/185 |
| 2012/0183840 A1* | 7/2012 | Lee | ...................... | H01M 2/1077 |
| | | | | 429/158 |
| 2014/0377641 A1* | 12/2014 | Kim | ........................ | H01M 2/08 |
| | | | | 429/185 |

FOREIGN PATENT DOCUMENTS

| | | | |
|---|---|---|---|
| JP | 2005203262 A | | 7/2005 |
| KR | 20000025737 A | * | 5/2000 |

OTHER PUBLICATIONS

Machine translation for KR-20000025737-A.*

* cited by examiner

*Primary Examiner* — Edu E. Enin-Okut
(74) *Attorney, Agent, or Firm* — Law Office of Katsuhiro Arai

(57) ABSTRACT

An electric storage cell has an electric storage element and a covering film package. The covering film package houses the electric storage element and includes: a metal layer having a first principle face on the electric storage element side and a second principle face on the opposite side of the first principle face, an internal resin layer made of synthetic resin and laminated to the first principle face, and an external resin layer made of synthetic resin and laminated to the second principle face, with a slit formed at least in the external resin layer; wherein a stress mitigation part to mitigate any stress that tries to separate the internal resin (Continued)

layers that are contacting each other, and a stress concentration part where this stress concentrates, are provided between the slit and the electric storage element.

9 Claims, 6 Drawing Sheets

(51) Int. Cl.
*H01M 2/02* (2006.01)
*H01G 11/78* (2013.01)
*H01G 11/06* (2013.01)
*H01M 10/0525* (2010.01)

(52) U.S. Cl.
CPC .... *H01M 10/0525* (2013.01); *H01M 2200/20* (2013.01); *H01M 2300/0025* (2013.01)

ELECTRIC STORAGE CELL, COVERING FILM AND ELECTRIC STORAGE MODULE

BACKGROUND

Field of the Invention

The present invention relates to an electric storage cell constituted by an electric storage element sealed with covering film, a covering film, and an electric storage module comprising a stack of such electric storage cells.

Description of the Related Art

Film-sealed batteries, which are electric storage elements sealed with covering film, are widely used in recent years. Film-sealed batteries are subject to rising pressure inside the battery due to generation of gaseous species as a result of electrolysis of the electrolyte medium, if the battery control circuit fails for some reason and abnormal voltage is applied as a result, or if the ambient temperature becomes abnormally high for some reason, while the battery is in use. As their internal pressure rises, film-sealed batteries will eventually experience a rupture of exterior material and gas will erupt from the ruptured area; however, it is not predictable where the rupture may occur, and depending on the location of rupture, surrounding equipment, etc., may be negatively affected.

To solve this problem, a configuration is disclosed in Patent Literature 1, for example, which involves a covering film whose seal part has a peninsula-shaped projected fusing part, so that when the covering film package expands and the projected fusing part peels, a through hole will be formed to serve as a pressure release part. This way, the peel-off stress generated by expansion of the film can be concentrated onto the projected fusing part to facilitate the progress of its peeling, thereby facilitating the release of the pressure caused by expansion of the package.

BACKGROUND ART LITERATURES

[Patent Literature 1] Japanese Patent Laid-open No. 2005-203262

SUMMARY

According to the configuration in Patent Literature 1, however, the narrow seal width at the through hole and projected fusing part may affect long-term reliability, in that moisture may permeate in through the fusing resin layer. Besides the configuration described in Patent Literature 1, there are other configurations designed to release the internal pressure by causing a projection to break through the expanded covering film; however, they are costly because, among other reasons, a component that serves as this projection must be provided on each device. Also, handling of such device requires attention because a projection is permanently present on it.

In light of the aforementioned situations, an object of the present invention is to provide a reliable electric storage cell, covering film, and electric storage module, which would allow for safe release of rising internal pressure in the event of abnormality.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, an electric storage cell pertaining to one mode of the present invention has an electric storage element and a covering film package.

The covering film package houses the electric storage element and comprises: a metal layer having a first principle face on the electric storage element side and a second principle face on the opposite side of the first principle face, an internal resin layer made of synthetic resin and laminated to the first principle face, and an external resin layer made of synthetic resin and laminated to the second principle face, with a slit formed at least in the external resin layer; wherein a stress mitigation part to mitigate any stress that tries to separate the internal resin layers that are contacting each other, and a stress concentration part where this stress concentrates, are provided between the slit and the electric storage element.

According to this configuration, a rise in the internal pressure of the electric storage cell in the event of its abnormality causes the metal layer and external resin layer to rupture at the location where the slit is formed, thereby causing the internal resin layer to expand through this tear. As the internal pressure rises further, the internal resin layer ruptures and the internal pressure is released as a result. In other words, the internal pressure is released at the location where the slit is formed, while any pressure release from parts other than the slit can be prevented. Also, the metal layer prevents moisture from permeating into the housing space in a normal state (where there is no abnormality in the electric storage cell), which ensures reliability of the electric storage cell.

Furthermore, the electric storage cell pertaining to the present invention has, between the slit and the electric storage element, the stress mitigation part to mitigate any stress that tries to separate the internal resin layers that are contacting each other, and the stress concentration part where this stress concentrates.

This allows the internal pressure that has risen due to an abnormality of the electric storage cell to be released without fail from the slit close to the stress concentration part. As a result, release of the internal pressure from locations other than the location where the slit is formed can be prevented.

To achieve the aforementioned object, an electric storage cell pertaining to another mode of the present invention has an electric storage element and a covering film package.

The covering film package houses the electric storage element and comprises: a metal layer having a first principle face on the electric storage element side and a second principle face on the opposite side of the first principle face, an internal resin layer made of synthetic resin and laminated to the first principle face, and an external resin layer made of synthetic resin and laminated to the second principle face, with a slit formed at least in the external resin layer; wherein a stress mitigation part having a convex structure, and a stress concentration part having a flat structure, are provided between the slit and the electric storage element, said convex structure being convex with reference to the flat structure. The stress mitigation part may include multiple convex structures.

The concave structure is typically formed by means of embossing. To be specific, the convex part of the concave/convex structure stands out in relief on the surface of the covering film package. By adopting this configuration, any stress applied between the slit and the electric storage element in a manner stretching the covering film package can be dispersed into a force that tries to extend the convex part of the stress mitigation part and a force that tries to extend the stress concentration part of the flat structure which is concave with reference to the stress mitigation part and may be flush with a surface of the external resin layer.

Accordingly, the aforementioned stress is used up as a force that tries to extend the convex part in the stress mitigation part, while it is directly transmitted to the stress concentration part. As a result, the stress concentration part is stretched more preferentially than the stress mitigation part, and the internal stress is released from the slit close to the stress concentration part.

This means that the electric storage cell pertaining to the present invention, because it is constituted to have the stress mitigation part and the stress concentration part, allows the release pressure, at which the internal pressure that has risen due to an abnormality of the electric storage cell is released, to be set to a desired level. This in turn allows for control of the release pressure to a desired level in those cells of small thickness whose covering film package would expand uniformly due to rising internal pressure, which has made it heretofore difficult to control the release pressure to a desired level in these cells (if the package expands uniformly, it is difficult to predict the location of a point of destruction of the covering film and the release pressure of destruction of the covering film).

The stress mitigation part may have a first stress mitigation area and a second stress mitigation area away from the first stress mitigation area, while the stress concentration part may be provided between the first stress mitigation area and the second stress mitigation area.

By adopting this configuration, the stress concentration part necessarily faces the slit between the slit and the electric storage element. As a result, the internal pressure that has risen due to an abnormality of the electric storage cell can be released without fail from the slit close to the stress concentration part.

The slit may be formed to a depth of 0 µm or more but no more than 5 µm in the external resin layer, measured as the distance from the bottom of the slit to the second principle face.

This way, the processing depth of the slit need not to be specified strictly, which in turn improves the productivity of electric storage cells.

The slit may be formed through the external resin layer and into the metal layer to a depth of 0 µm or more but no more than 5 µm, measured as the distance from the bottom of the slit in the metal layer to the second principle face.

According to this configuration, the slit may run as deep as reaching between the first principle face and second principle face of the metal layer. In other words, this configuration allows a slit to be formed not only in the external resin layer, but also in the metal layer. This way, the metal layer ruptures more easily and, in the event of an abnormality of the electric storage cell, any excessive rise in its internal pressure can be prevented.

The covering film package may have a seal area formed around the periphery of the electric storage element as a result of the internal resin layers thermally fusing with each other, and the slit may be formed in parallel with the periphery of the seal area.

This makes it easy for the internal resin layer to expand and rupture at the slit, and thereby allows the release pressure of the slit to be reduced.

The internal resin layer may be made of non-oriented cast polypropylene, and the external resin layer may be made of polyethylene terephthalate.

To achieve the aforementioned object, a covering film pertaining to one mode of the present invention represents a covering film that forms a housing space in which an electric storage element is housed, wherein the covering film houses the electric storage element and comprises: a metal layer having a first principle face on the electric storage element side and a second principle face on the opposite side of the first principle face, an internal resin layer made of synthetic resin and laminated to the first principle face, and an external resin layer made of synthetic resin and laminated to the second principle face, with a slit formed at least in the external resin layer; wherein a stress mitigation part to mitigate any stress that tries to separate the internal resin layers that are contacting each other, and a stress concentration part where this stress concentrates, are provided between the slit and the electric storage element.

By covering the storage element with the covering film having the aforementioned configuration, a reliable electric storage cell can be produced which would allow its rising internal pressure to be released safely in the event of abnormality.

To achieve the aforementioned object, an electric storage module pertaining to one mode of the present invention represents an electric storage module constituted by multiple electric storage cells that are stacked on top of each other.

The electric storage cells each have an electric storage element and a covering film package.

The covering film package houses the electric storage element and comprises: a metal layer having a first principle face on the electric storage element side and a second principle face on the opposite side of the first principle face, an internal resin layer made of synthetic resin and laminated to the first principle face, and an external resin layer made of synthetic resin and laminated to the second principle face, with a slit formed at least in the external resin layer; wherein a stress mitigation part to mitigate any stress that tries to separate the internal resin layers that are contacting each other, and a stress concentration part where this stress concentrates, are provided between the slit and the electric storage element.

The covering film package may have a contact area where the internal resin layers are contacting each other around the periphery of the electric storage element, and the slit is formed in a location corresponding to, of the contact area of each electric storage cell, the one facing a contact area of the adjacent electric storage cell.

According to this configuration, by providing a leakage-countermeasure component (sponge or other absorbent member) in the aforementioned location, this leakage-countermeasure component applied commonly to the adjacent electric storage cells can be used, in the event that the rising internal pressure of the electric storage cell due to its abnormality causes the electrolyte to leak from the slit, to absorb the electrolyte.

If slits are formed near a back-to-back connection part of the adjacent electric storage cells, a leakage-countermeasure for leakage of the electrolyte must be provided for each cell; if the slits are formed to face in the same direction, a leakage-countermeasure component must be provided for each cell based on a different structure.

This means that, by providing slits in the aforementioned locations, an electric storage module that can address leakage of electrolyte from the slits, should it occur, without complicating the apparatus configuration and also at low cost, can be provided.

As described above, a reliable electric storage cell, covering film, and electric storage module, which would allow for safe release of rising internal pressure in the event of abnormality, can be provided according to the present invention.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
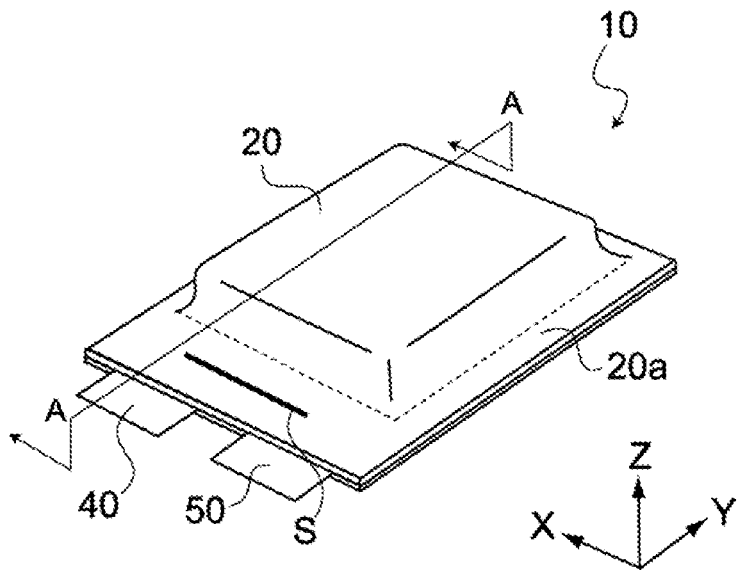
FIG. 1 is a perspective view of an electric storage cell pertaining to an embodiment of the present invention.

10 - - - Electric storage cell
20 - - - Covering film
20a - - - Contact area
20b - - - Element housing part
20c - - - Intermediate part
21 - - - Stress mitigation part
22 - - - Stress concentration part
25 - - - Metal layer
25a - - - First principle face
25b - - - Second principle face
26 - - - Internal resin layer
27 - - - External resin layer
30 - - - Electric storage element
100 - - - Electric storage module
S - - - Slit

DETAILED DESCRIPTION OF EMBODIMENTS

An embodiment of the present invention is explained below by referring to the drawings.

[Structure of Electric Storage Cell]

Figure 2:
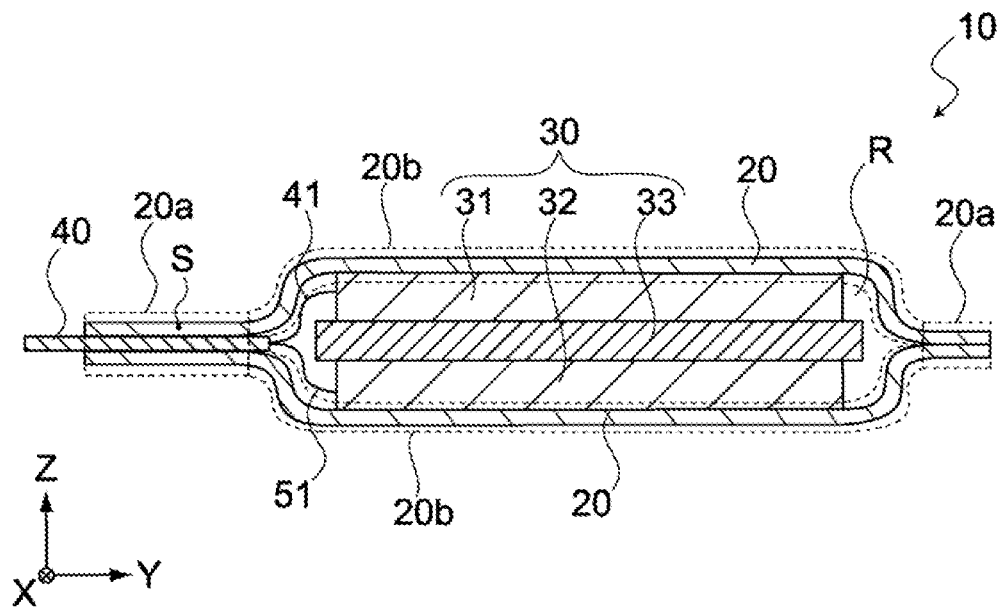
FIG. 2 is a cross sectional view of the electric storage cell pertaining to the embodiment of the present invention.

FIG. 1 is a perspective view of an electric storage cell 10 pertaining to this embodiment, while FIG. 2 is a cross sectional view of the electric storage cell 10 in FIG. 1 along line A-A. In the figures below, the X direction, Y direction, and Z direction represent three directions that are orthogonal to each other.

As shown in FIGS. 1 and 2, the electric storage cell 10 has covering films 20, an electric storage element 30, a positive electrode terminal 40, and a negative electrode terminal 50.

In the electric storage cell 10, the covering film package constituted by the two covering films 20 forms a housing space R, and the electric storage element 30 is housed in the housing space R. The two covering films 20 are sealed around the periphery of the electric storage element 30, and the covering film package has contact areas 20a where the two covering films 20 contact each other, and an element housing part 20b where the electric storage element 30 is housed. The contact areas 20a and element housing part 20b will be described later.

The thickness of the electric storage cell 10 in this embodiment is not limited in any way, but it may be 12 mm or less, for example. This way, the operations and effects achieved by the formation of the slit S, stress mitigation part 21, and stress concentration part 22 in the electric storage cell 10, as explained later, will become more significant.

As shown in FIG. 2, the electric storage element 30 has a positive electrode 31, a negative electrode 32, and a separator 33. The positive electrode 31 and negative electrode 32 face each other with the separator 33 in between, and are housed in the housing space R.

The positive electrode 31 functions as the positive electrode of the electric storage element 30. The positive electrode 31 may be made of a positive electrode material that contains positive electrode active material, binder, etc. The positive electrode active material may be activated carbon, for example. The positive electrode active material may be changed as deemed appropriate according to the type of the electric storage cell 10.

The negative electrode 32 functions as the negative electrode of the electric storage element 30. The negative electrode 32 may be made of a negative electrode material that contains negative electrode active material, binder, etc. The negative electrode active material may be carbon material, for example. The negative electrode active material may be changed as deemed appropriate according to the type of the electric storage cell 10.

The separator 33 is provided between the positive electrode 31 and the negative electrode 32, to allow the electrolyte to pass through it and also prevent (insulate) the positive electrode 31 and the negative electrode 32 from contacting each other. The separator 33 may be a woven fabric, non-woven fabric, synthetic microporous resin membrane, etc.

While one positive electrode 31 and one negative electrode 32 are provided in FIG. 2, multiple positive electrodes and multiple negative electrodes can be provided. In this case, the multiple positive electrodes 31 and multiple negative electrodes 32 may be stacked together alternately, with separators 33 in between. Also, the electric storage element 30 may be constituted by rolling a laminate comprising a positive electrode 31, a negative electrode 32, and a separator 33, into a roll.

The type of the electric storage element 30 is not limited in any way, and it may be a lithium ion capacitor, lithium ion battery, electrical double-layer capacitor, etc. Together with the electric storage element 30, electrolyte is housed in the housing space R. This electrolyte is SBP-BF$_4$ (spirobipyrrolidinium tetrafluoroborate) or the like, for example, and any electrolyte may be selected according to the type of the electric storage element 30.

The positive electrode terminal 40 is an external terminal of the positive electrode 31. As shown in FIG. 2, the positive electrode terminal 40 is electrically connected to the positive electrode 31 via positive electrode wiring 41, being routed between the two covering films 20 in the contact area 20a and led out from the interior to the exterior of the housing space R. The positive electrode terminal 40 may be a foil or wire made of conductive material.

As described above, the electric storage cell 10 has the contact areas 20a and the element housing part 20b. The contact areas 20a are where the two covering films 20 contact each other, while the element housing part 20b, enclosed by the contact areas 20a, is where the electric storage element 30 is housed.

Figure 3:
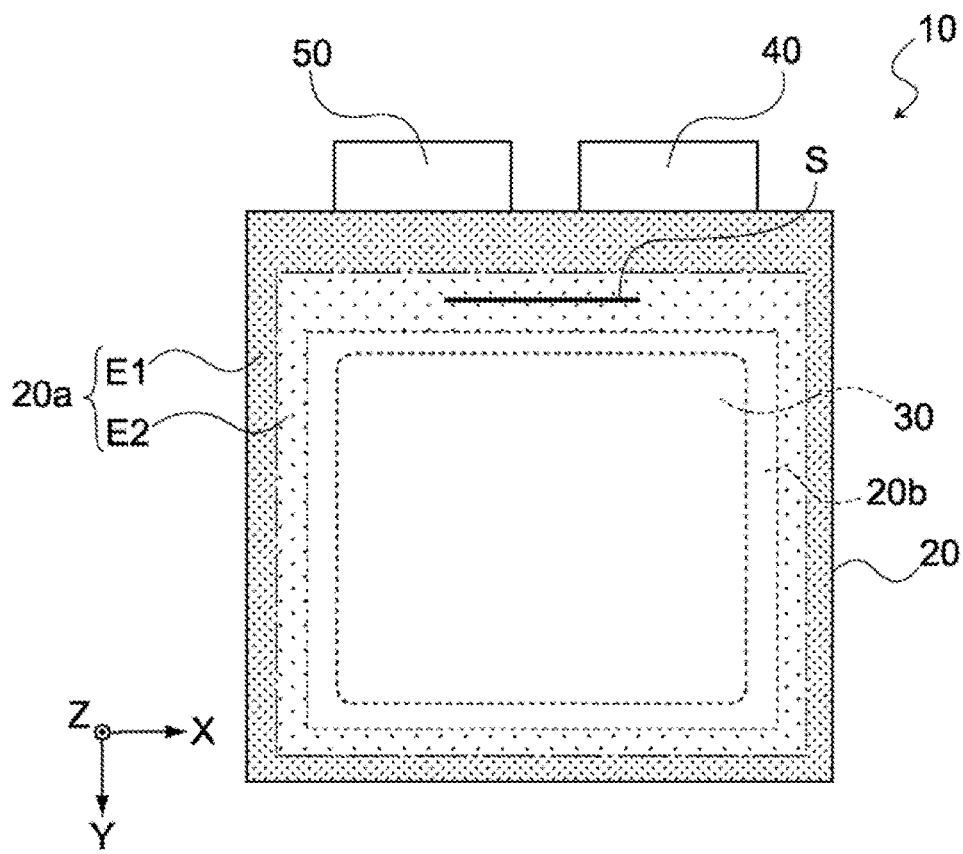
FIG. 3 is a plan view of the electric storage cell pertaining to the embodiment of the present invention.

FIG. 3 is a schematic view of the electric storage cell 10 as viewed from the Z direction. As shown in this figure, the contact areas 20a each have a seal area E1 and a non-seal area E2. The width of the contact area 20a may be anywhere from around several millimeters to several tens of millimeters, for example.

The seal area E1 is an area formed by the covering films 20 thermally fusing with each other, and provided around the periphery of the covering films 20.

The non-seal area E2 is an area contacted by the covering films 20 as a result of the thermal fusion in the seal area E1, and provided between the seal area E1 and the element housing part 20b. The width of the seal area E1 and non-seal area E2 may be anywhere from around several millimeters to several tens of millimeters, for example.

[Configuration of Covering Film]

Figure 4:
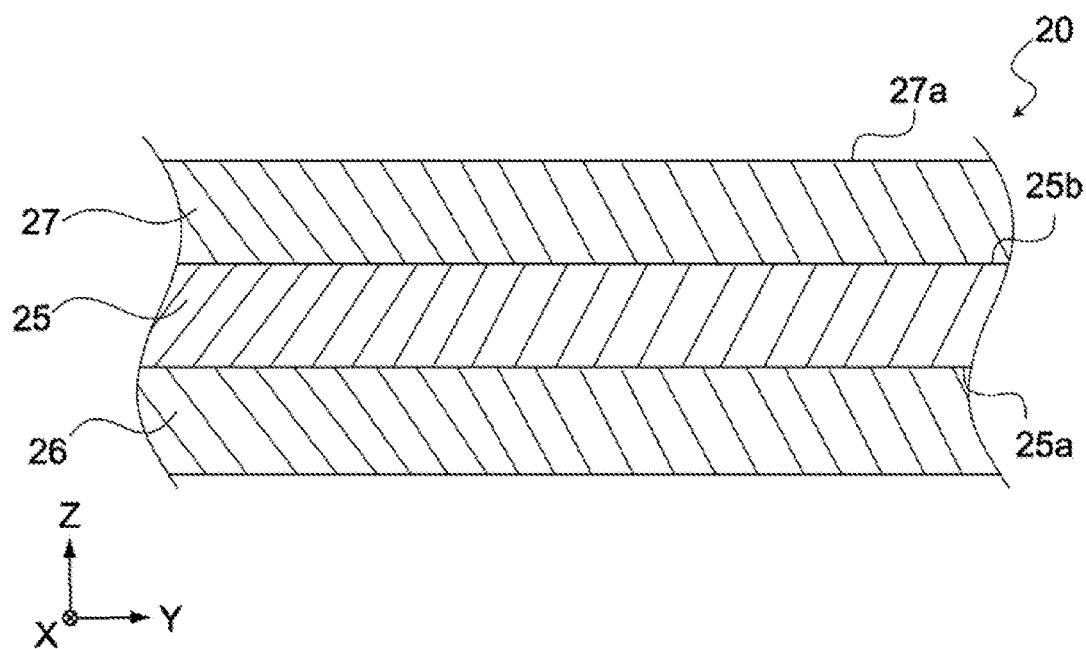
FIG. 4 is a cross sectional view of a covering film provided in an electric storage cell pertaining to an embodiment of the present invention.

FIG. 4 is a cross sectional view of each covering film 20. As shown in this figure, the covering film 20 is constituted by a metal layer 25, an internal resin layer 26, and an external resin layer 27.

The metal layer 25 is a layer made of foil-like metal, and has a function to prevent moisture in air from permeating through it. As shown in FIG. 4, the metal layer 25 has a first principle face 25a, and a second principle face 25b on the opposite side thereof.

The metal layer 25 may be a metal foil made of aluminum, for example. Besides the foregoing, the metal layer 25 may also be a foil of copper, nickel, stainless steel, etc. Preferably the thickness of the metal layer 25 pertaining to this embodiment is around several tens of micrometers.

The internal resin layer 26 is laminated to the first principle face 25a to constitute the inner periphery face of the housing space R, covering and insulating the metal layer 25.

The internal resin layer 26 is made of synthetic resin, such as non-oriented cast polypropylene (CPP), for example. Besides the foregoing, the internal resin layer 26 may be made of polyethylene or acid-modified product thereof, polyphenylene sulfide, polyethylene terephthalate, polyamide, ethylene-vinyl acetate copolymer, or the like. Also, the internal resin layer 26 may be constituted by multiple synthetic resin layers laminated together.

The external resin layer 27 is laminated to the second principle face 25b to constitute the surface of the electric storage cell 10, covering and protecting the metal layer 25.

The external resin layer 27 is made of synthetic resin, such as polyethylene terephthalate, for example. Besides the foregoing, the external resin layer 27 may also be made of nylon, polyethylene naphthalate, bi-axially oriented polypropylene, polyimide, polycarbonate, or the like.

In this embodiment, the housing space R is formed by the covering film package constituted as above, where the two covering films 20 are facing each other with the electric storage element 30 in between and sealed in a seal area E1 of the contact areas 20a which also include a non-seal area E2. In the seal area E1, the internal resin layers 26 of the two covering films 20 are thermally fused with each other. The covering films 20 are each positioned in such a way that the internal resin layer 26 faces the housing space R side (inside) and the external resin layer 27 constitutes the surface 27a side (outside).

The covering films 20 are used in a condition where they maintain flexibility, and may be formed in such a way that their periphery is curved according to the shape of the electric storage element 30, as shown in FIG. 2. Also, the covering films 20 may be used in a condition where they have been pre-formed to such shape by means of embossing. A slit is formed in one of the two covering films 20.

[Configuration of Slit]

Figure 5:
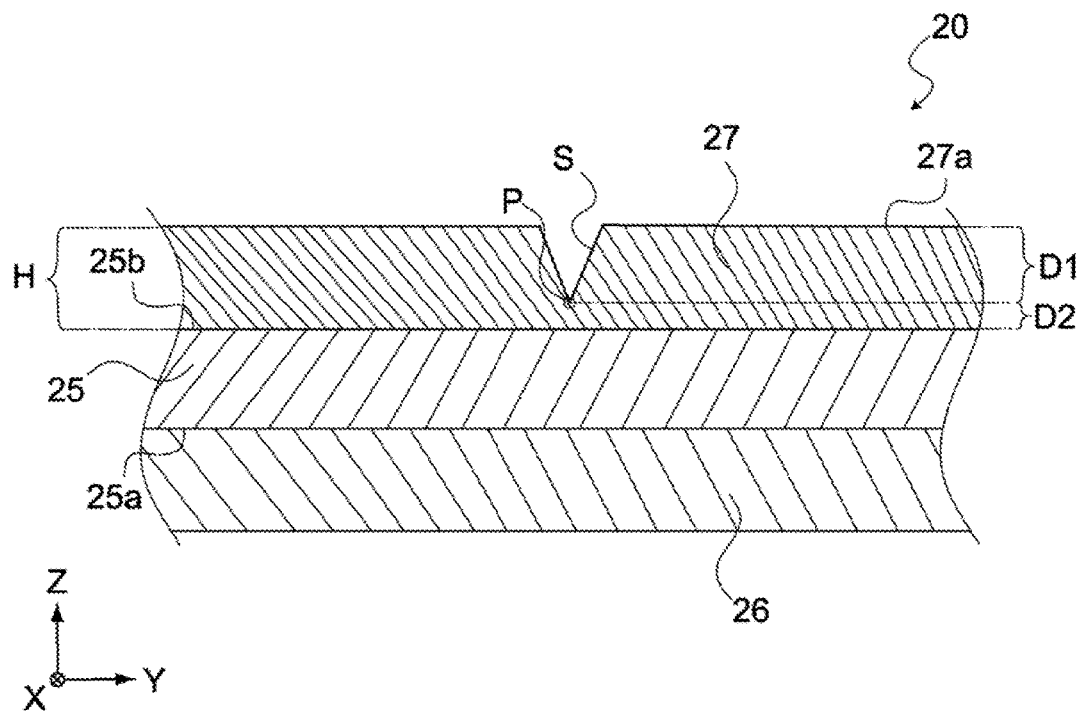
FIG. 5 is a cross sectional view of a covering film provided in an electric storage cell pertaining to an embodiment of the present invention.
Figure 6:
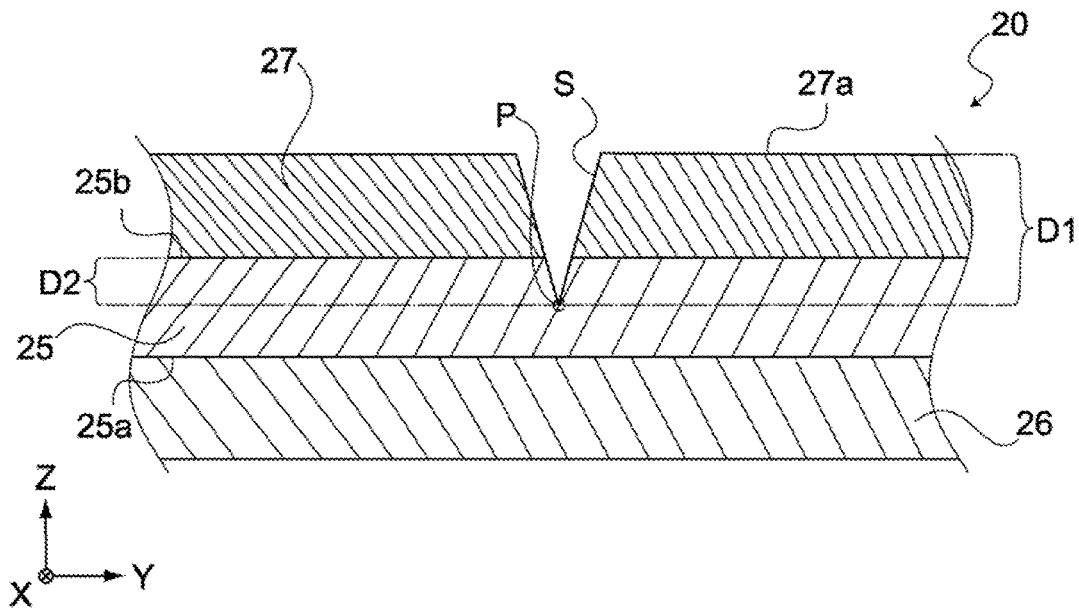
FIG. 6 is a cross sectional view of a covering film provided in an electric storage cell pertaining to another embodiment of the present invention.
Figure 7:
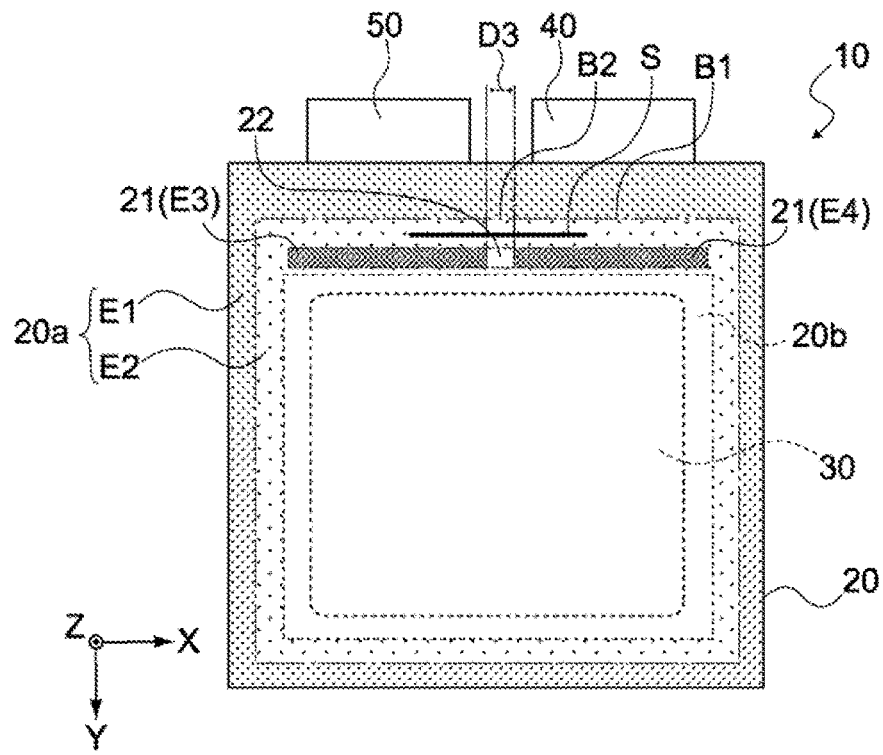
FIG. 7 is a plan view of an electric storage cell pertaining to an embodiment of the present invention.

FIGS. 5 and 6 are each a cross sectional view of the covering film 20 that includes a slit S, while FIG. 7 is a schematic view of the electric storage cell 10 as viewed from the Z direction. As shown in FIG. 5, the slit S is formed from the surface 27a of the external resin layer 27 to midway in the layer. As a result, the external resin layer 27 is partially separated by the slit S.

Preferably the depth D1 of the slit S is such that the metal layer 25 prevents moisture permeation in a normal state, but in the event of abnormality, the metal layer 25 would rupture quickly. To be specific, the depth may be 0 μm or more but no more than 5 μm, measured as the distance D2 from the bottom P of the slit S in the external resin layer 27 to the second principle face 25b.

Also, the slit S pertaining to this embodiment may have a depth extending to between the first principle face 25a and the second principle face 25b, of the metal layer 25, as shown in FIG. 6.

To be specific, the slit S may be formed through the external resin layer 27 and into the metal layer 25 to a depth of 0 μm or more but no more than 5 μm, measured as the distance D2 from the bottom P of the slit S in the metal layer 25 to the second principle face 25b. The result of this is that, in the event of an abnormality of the electric storage cell 10, any excessive rise of its internal pressure can be avoided.

[About Stress Mitigation Part and Stress Concentration Part]

The covering films 20 pertaining to this embodiment each have a stress mitigation part 21 and a stress concentration part 22, as shown in FIG. 7. As shown in this figure, the stress mitigation part 21 is provided in the non-seal area E2 between the slit S and the electric storage element 30, and has a first stress mitigation area E3 and a second stress mitigation area E4.

The length of the stress mitigation part 21 in the X direction (total length of the first and second stress mitigation areas E3, E4 in the X direction) is not limited in any way, but it may be equal to or greater than the length of the electric storage element 30 in the X direction. The length of the stress mitigation part 21 in the X direction may be anywhere from around several millimeters to several tens of millimeters, for example.

The first and second stress mitigation areas E3, E4 pertaining to this embodiment typically have a convex structure resulting from embossing, but their structure is not limited thereto and it may be a structure having a wavy shape, etc.

It should be noted that the height of the convex part in the first and second stress mitigation areas E3, E4 may be 0.5 mm or more but no more than 1.0 mm, for example.

As shown in FIG. 7, the stress concentration part 22 is provided between the first stress mitigation area E3, and the second stress mitigation area E4 which is away from the first stress mitigation area E3 in the X direction. The width D3 of the stress concentration part 22 in the X direction may be anywhere from around several millimeters to several tens of millimeters, for example. Also, the stress concentration area 22 has a flat structure just like the non-seal area E2 where the stress mitigation part 21 is not formed.

Figure 8:
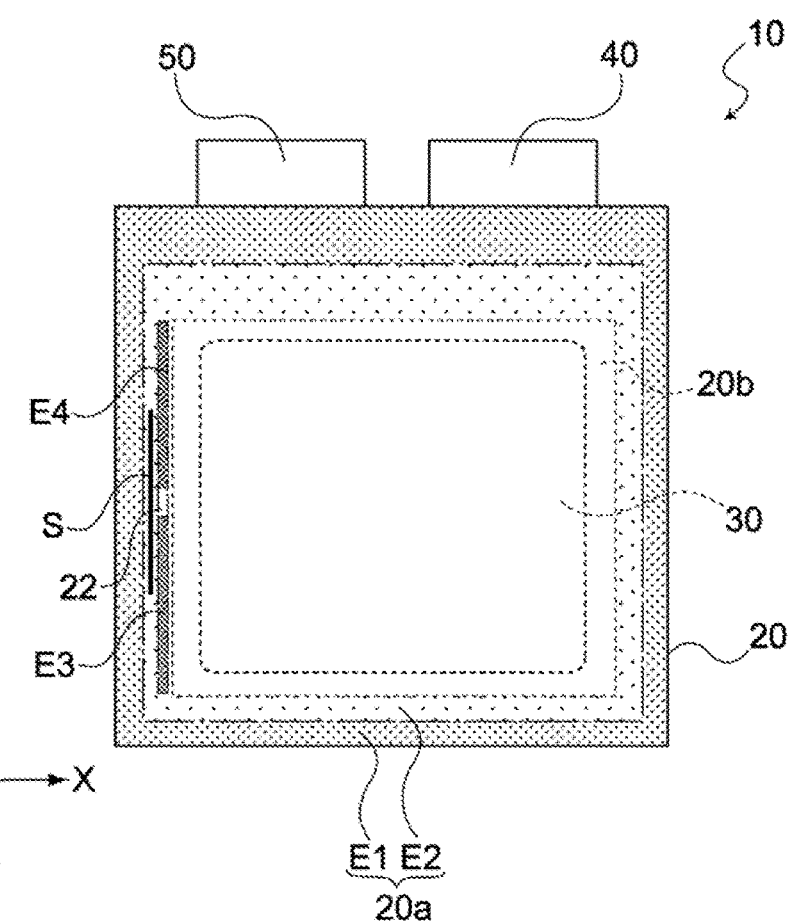
FIG. 8 is a plan view of an electric storage cell pertaining to another embodiment of the present invention.
Figure 9:
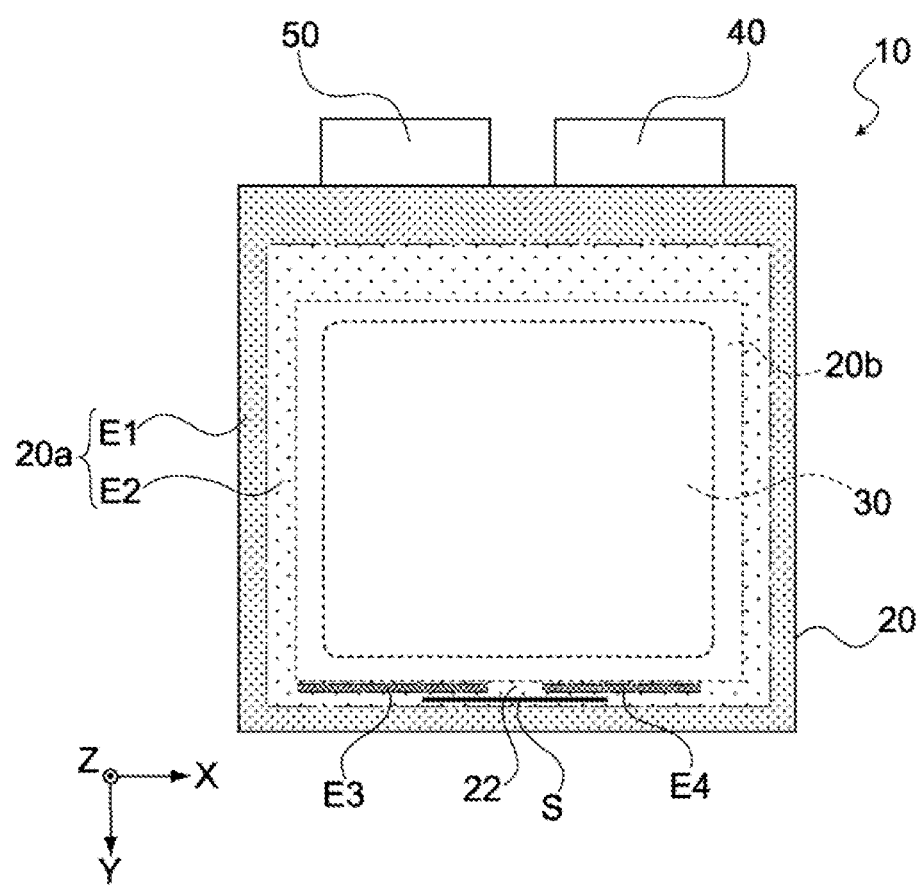
FIG. 9 is a plan view of an electric storage cell pertaining to still another embodiment of the present invention.

FIGS. 8 and 9 are each a schematic view showing the positions where the slit S, stress mitigation part 21, and stress concentration part 22 are formed.

In this embodiment, the extending direction of the slit S is not limited in any way, and it may be orthogonal to the longitudinal direction of the seal area E1 where the positive electrode terminal 40 and negative electrode terminal 50 are provided, as shown in FIG. 8, or it may be parallel with this longitudinal direction, as shown in FIG. 9.

Also, the positions where the stress mitigation part 21 and stress concentration part 22 are formed are not limited to the positions shown in FIG. 7, and they may be provided between the slit S running orthogonal to the longitudinal direction of the seal area E1 where the positive electrode terminal 40 and negative electrode terminal 50 are provided on one hand, and the electric storage element 30 on the other, as shown in FIG. 8.

Or, they may be provided between the slit S formed in a location other than the non-seal area E2 between the seal area E1 where the positive electrode terminal 40 and negative electrode terminal 50 are provided, and the electric storage element 30, on one hand, and the electric storage element 30 on the other, as shown in FIG. 9.

[Effects of Slit]

When the electric storage cell 10 is in use, each covering film 20 maintains the condition shown in FIGS. 4 to 6 in a normal state (where there is no abnormality in the electric storage element 30), or specifically when the internal pressure of the housing space R is within the allowable range. In this condition, the slit S does not separate the metal layer 25, and therefore moisture permeation through the covering film 20 is prevented by the metal layer 25.

If an abnormality occurs in the electric storage element 30 while the electric storage cell 10 is in use and the internal pressure rises as a result, on the other hand, the covering film 20 expands. Then, the metal layer 25 and external resin layer 27 rupture where the slit S is formed. Accordingly, the internal resin layer 26 partially projects out of the covering film 20 through the tear in the ruptured metal layer 25 and external resin layer 27, and expands. Then, when the internal pressure reaches or exceeds a specified level, the internal resin layer 26 that has projected out ruptures and the internal pressure of the housing space R is released.

As explained above, the formation of the slit S allows the position at which the internal resin layer 26 would rupture to be specified beforehand. If no slit S is provided, the seal area E1, which is the weakest part of the covering film package, breaks open and the internal pressure is released. In this case, there is no way of knowing which part of the seal area E1, formed over the entire periphery of the electric storage element 30, will break open.

Also, as described above, the release of internal pressure in the event of abnormality takes place due to the rupture of the internal resin layer 26. In other words, the release pressure at which the internal pressure of the electric storage cell 10 is released can be adjusted by the strength of the internal resin layer 26.

The strength of the internal resin layer 26 can be adjusted by the thickness of the internal resin layer 26. In this case, the strength of the internal resin layer 26 can be adjusted by the overall thickness of the internal resin layer 26. At any rate, as long as the internal pressure that causes the internal resin layer 26 to rupture at the slit S is lower than the internal pressure at which the seal area E1 breaks open, the configuration can be modified.

[Operations of Stress Mitigation Part and Stress Concentration Part]

In this embodiment, the aforementioned release pressure can be adjusted by providing the stress mitigation part 21 and stress concentration part 22 between the slit S and the electric storage element 30.

To be more specific, the convex structure of the stress mitigation part 21 pertaining to this embodiment is typically formed by means of embossing. In other words, the convex part of the stress mitigation part is a convex part that stands out in relief on the surface of the covering film 20 as a result of the covering film 20 being pressed.

Because of this configuration, the tensile stress applied to the covering film 20 between the slit S and the electric storage element 30 when the covering film 20 extends due to the abnormality of the electric storage cell 10, is dispersed into a force that tries to extend the aforementioned convex part of the stress mitigation part 21 and a force that tries to extend the stress concentration part 22 of flat structure which is concave with reference to the stress mitigation part and may be flush with a surface of the external resin layer.

Here, the aforementioned stress is used up as a force that tries to extend the convex structure in the stress mitigation part 21, while it is transmitted directly to the stress concentration part 22. Accordingly, the stress concentration part 22 is extended more preferentially than the stress mitigation part 21, and consequently the internal pressure is released from the slit S close to the stress concentration part 22.

In other words, the electric storage cell 10 pertaining to this embodiment, because of its configuration having the stress mitigation part 21 and stress concentration part 22, allows for control of the release pressure to a desired level on those cells of small thickness whose covering film would expand uniformly due to rising internal pressure, which has made it heretofore difficult to control the release pressure to a desired level on these cells.

Also, in this embodiment, the aforementioned release pressure can also be adjusted by adjusting the distance between the boundary B1 of the seal area E1 and the non-seal area E2 on one hand, and the slit S on the other.

To be specific, a rise in the internal pressure of the electric storage cell 10 causes the stress (force that tries to separate the covering films 20 from each other) to concentrate most at the boundary of the seal area E1 and the non-seal area E2. And, as described above, the stress mitigation part 21 and stress concentration part 22 are provided in this embodiment. As a result, the aforementioned stress applied to the boundary B1 concentrates on the boundary B2 facing the stress concentration part 22 in the Y direction.

Accordingly, the non-seal area E2 facing the stress concentration part 22 in the Y direction is primarily pulled in the Y direction. Because of this, the aforementioned release pressure can be adjusted by the distance between the boundary B2 and the slit S.

Moving the slit S away from the boundary B2 (boundary B1) mitigates the aforementioned stress that generates at the slit S when internal pressure of the electric storage cell 10 rises due to its abnormality. In essence, the farther away the slit S from the boundary B2 (boundary B1), the more difficult it becomes for the stress to propagate to the slit S and the higher the release pressure becomes.

This means that, with the electric storage cell 10 pertaining to this embodiment, the aforementioned release pressure can be adjusted to a desired level by utilizing the operations described above that manifest where the slit S is formed. It should be noted that, in this embodiment, the release pressure is preferably adjusted to 0.35 MPa or more but no more than 0.45 MPa; however, the release pressure is not limited to this range.

Also, with the electric storage cell 10 pertaining to this embodiment, the adjustability of the release pressure in the event of abnormality prevents the aforementioned release pressure from becoming higher than a desired level even when the thickness of the electric storage cell 10 is relatively small. This way, release of internal pressure from a location other than the location where the slit S is formed, can be prevented.

Furthermore, the aforementioned release pressure can also be adjusted by adjusting the width D3 of the stress concentration part 22.

If the width D3 of the stress concentration part 22 is large, the area over which the tensile stress applies to the covering film 20 between the slit S and the electric storage element 30 increases, and this stress is dispersed as a result. Therefore, the aforementioned release pressure becomes high. If the width D3 is small, on the other hand, the area over which the aforementioned stress applies decreases, and this stress concentrates locally as a result. Because of this, the internal pressure of the electric storage cell 10 is released at the specified pressure and any excessive rise in the aforementioned release pressure is prevented.

In this embodiment, the aforementioned release pressure is adjusted to a desired level by adjusting the distance between the boundary B2 (boundary B1) and the slit S, or the width D3 of the stress concentration part 22, among others, as described above, which means that, under the present invention, the depth D1 of the slit S does not have much bearing on the setting of the aforementioned release pressure. As a result, the processing accuracy of the slit S can be relaxed more than what has been heretofore permitted.

To be specific, the allowable depth D1 of the slit S now ranges from a depth approx. 5 µm shallower than the thickness H of the external resin layer 27 to a depth approx. 5 µm deeper than the thickness H. As a result, the productivity of electric storage cells 10 can be improved.

[Configuration of Electric Storage Module]

Figure 10:
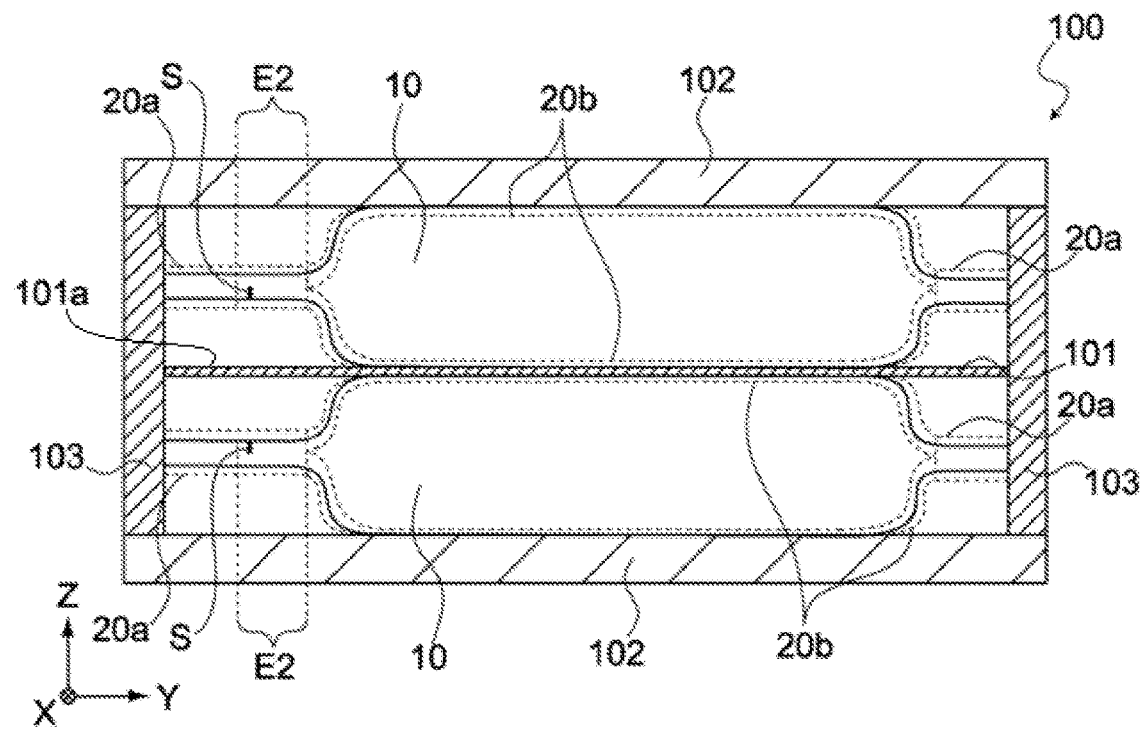
FIG. 10 is a schematic view of an electric storage module pertaining to an embodiment of the present invention.

An electric storage module can be constituted by stacking multiple electric storage cells 10 per this embodiment on top of each other. FIG. 10 is a schematic view of an electric storage module 100. The electric storage module 100 has multiple electric storage cells 10, heat conductive sheets 101, plates 102, and support members 103, as shown in this figure.

The multiple electric storage cells 10 are stacked together with the heat conductive sheets 101 in between, and supported by the support members 103. The number of electric storage cells 10 may be two or more. The positive electrode terminals 40 and negative electrode terminals 50 of the electric storage cells 10 may be connected between the electric storage cells 10 via wiring or terminals that are not illustrated. Also, plates 102 are stacked at the top face and bottom face of the multiple electric storage cells 10.

As shown in FIG. 10, the electric storage module 100 has each slit S formed in each non-seal area E2, and therefore expansion of each internal resin layer 26 is not disrupted by each plate 102 and consequently the internal pressure can be released at the specified pressure.

Also, as shown in FIG. 10, the electric storage module 100 pertaining to this embodiment is such that each slit S is formed in a location of the contact areas 20a of each electric storage cell 10, where the contact areas 20a of the adjacent electric storage cells 10 face each other.

This means that, by providing a leakage-countermeasure component (sponge or other absorbent member) in the aforementioned location, this leakage-countermeasure component applied commonly to the adjacent electric storage cells 10 can be used (e.g., by shortening a part 101a of the heat conductive sheet in FIG. 10 to make a common space for accommodating the common leakage-coping component), in the event that the rising internal pressure of the electric storage cell 10 due to its abnormality causes the electrolyte to leak from the slit S, to absorb the electrolyte.

If slits S are formed near the back-to-back connection part of the adjacent electric storage cells 10, a leakage countermeasure must be provided for each cell; if the slits S are formed in the same direction, a leakage-countermeasure component must be provided for each cell based on a different structure.

This means that, by providing slits S in the aforementioned locations, an electric storage module 100 that can address leakage of electrolyte from the slits S, should it occur, without complicating the apparatus configuration and also at low cost, can be provided.

[Variation Example]

Figure 11:
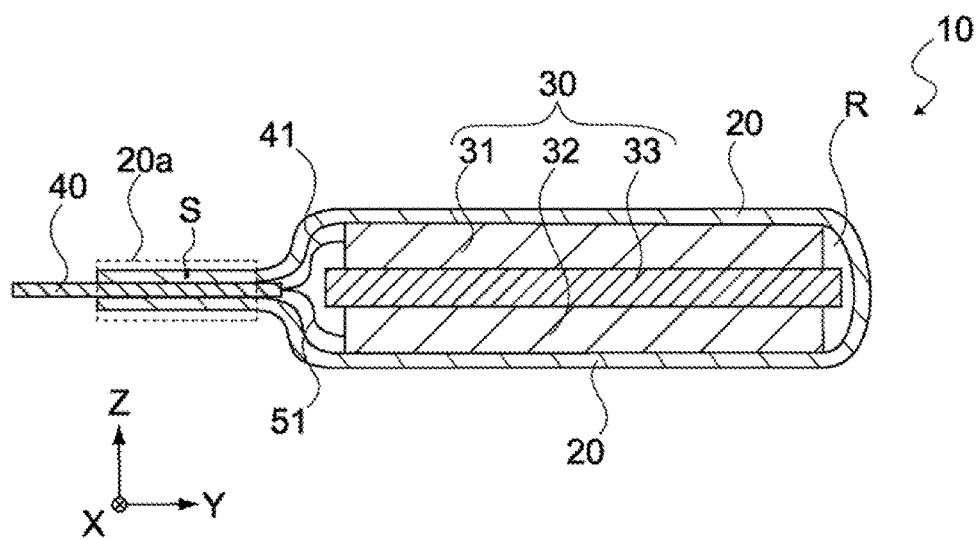
FIG. 11 is a cross sectional view of an electric storage cell pertaining to a variation example of the present invention.

FIG. 11 is a cross sectional view of covering films 20 pertaining to a variation example. Although the electric storage cell 10 in the aforementioned embodiment is such that the housing space R is sealed by the covering film package constituted by the two covering films 20, this not always the case. As shown in FIG. 11, the electric storage cell 10 may be constituted in such a way that the housing space R is sealed by a covering film package which is formed by bending one covering film 20 around an electric storage element 30 and then sealing the three sides.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-129038, filed Jun. 29, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electric storage cell, having:
    an electric storage element; and;
    a covering film package that houses the electric storage element and comprises a covering film having an upper portion and a lower portion which have a seal area where the upper and lower portions of the covering film are sealed around a periphery of the electric storage element to accommodate the electric storage element therebetween, said covering film comprising:
        a metal layer having a first principle face on an electric storage element side and a second principle face on an opposite side of the first principle face,
        an internal resin layer made of synthetic resin and laminated to the first principle face, wherein each of the upper and lower portions has the internal resin layer, and the internal resin layers of the upper and lower portions are in contact with each other in a contact area including the seal area around the periphery of the electric storage element, and
        an external resin layer made of synthetic resin and laminated to the second principle face, with a slit formed at least in the external resin layer at a location between the seal area and the electric storage element as viewed from above,
        wherein the contact area further includes, between the seal area and the electric storage element as viewed from above, a non-seal area where the internal resin layers are contacting each other but are not sealed, and
        wherein a first stress mitigation part and a second stress mitigation part placed apart from each other, each constituted by a convex structure pre-formed on an outer surface of the external resin layer, are disposed between the slit and the electric storage element in the non-seal area as viewed from above to mitigate any stress that tries to separate the internal resin layers that are contacting each other in the contact area in a manner that stress concentrates in an area, referred to as a stress concentration part, which is a part of the non-seal area and is located between the first stress mitigation part and the second stress mitigation part and between the slit and the electric storage element as viewed from above, wherein the slit and the stress concentration part are separated solely by a part of the non-seal area as viewed from above.

2. An electric storage cell according to claim 1, wherein the stress concentration part is constituted by a flat structure, said convex structure being convex with reference to the flat structure in a thickness direction of the covering film.

3. An electric storage cell according to claim 1, wherein in the one of the upper and lower portions, the slit is formed, without penetrating the metal layer, to a depth of 0 μm or more but no more than 5 μm, measured as a distance from a bottom of the slit in the external resin layer to the second principle face.

4. An electric storage cell according to claim 1, wherein in the one of the upper and lower portions, the slit is formed through the external resin layer into the metal layer to a depth of 0 μm or more but no more than 5 μm, measured as a distance from a bottom of the slit in the metal layer to the second principle face.

5. An electric storage cell according to claim 1, wherein the seal area is formed around a periphery of the electric storage element where the internal resin layers are thermally fused to each other, and the slit is formed in parallel with a periphery of the seal area.

6. An electric storage cell according to claim 1, wherein the internal resin layer is made of non-oriented cast polypropylene, and the external resin layer is made of polyethylene terephthalate.

7. A covering film that forms a housing space in which an electric storage element is housed, having an upper portion and a lower portion which have a seal area where the upper and lower portions of the covering film are sealed around a periphery of the electric storage element to accommodate the electric storage element therebetween, said covering film comprising:
    a metal layer having a first principle face on an electric storage element side and a second principle face on an opposite side of the first principle face,
    an internal resin layer made of synthetic resin and laminated to the first principle face, wherein each of the upper and lower portions has the internal resin layer, and the internal resin layers of the upper and lower portions are in contact with each other in a contact area including the seal area around the periphery of the electric storage element, and
    an external resin layer made of synthetic resin and laminated to the second principle face, with a slit formed at least in the external resin layer at a location between the seal area and the electric storage element as viewed from above,
    wherein the contact area further includes, between the seal area and the electric storage element as viewed from above, a non-seal area where the internal resin layers are contacting each other but are not sealed, and
    wherein a first stress mitigation part and a second stress mitigation part placed apart from each other, each constituted by a convex structure pre-formed on an outer surface of the external resin layer, are disposed between the slit and the electric storage element in the non-seal area as viewed from above to mitigate any stress that tries to separate the internal resin layers that are contacting each other in the contact area in a manner that stress concentrates in an area, referred to as a stress concentration part, which is a part of the non-seal area and is located between the first stress mitigation part and the second stress mitigation part and between the slit and the electric storage element as viewed from above, wherein the slit and the stress concentration part are separated solely by a part of the non-seal area as viewed from above.

8. An electric storage module constituted by multiple electric storage cells that are stacked on top of each other, wherein each of the electric storage cells is defined in claim 1.

9. An electric storage module according to claim 8, wherein the slit is formed in the contact area of each electric storage cell, and a pair of the electric storage cells are stacked in a way that the slits of the electric storage cells face each other.

* * * * *